March 17, 1936.  O. F. A. BIEBER  2,034,172
HEATING PLANT
Filed March 12, 1934  2 Sheets-Sheet 2
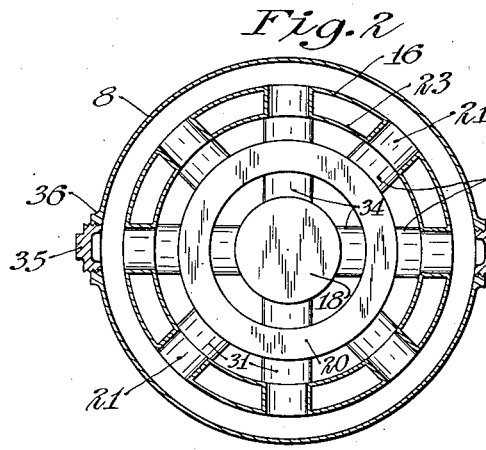
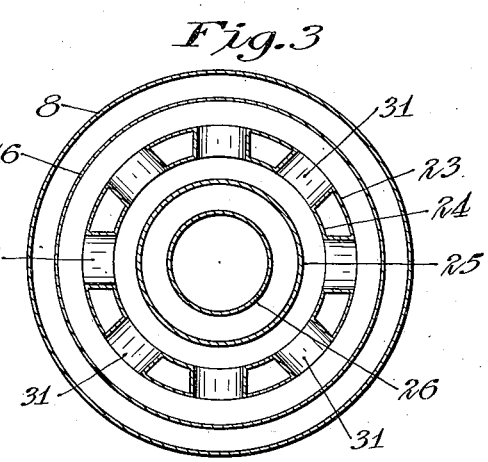
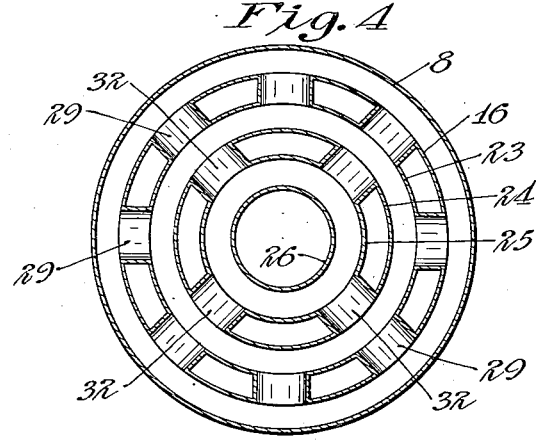
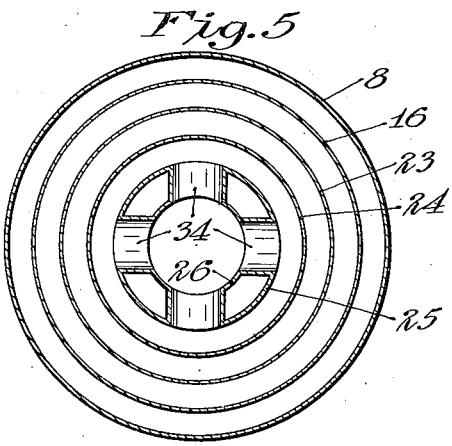
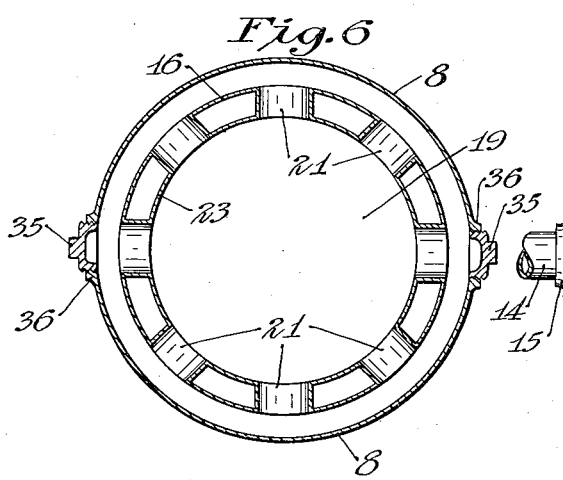
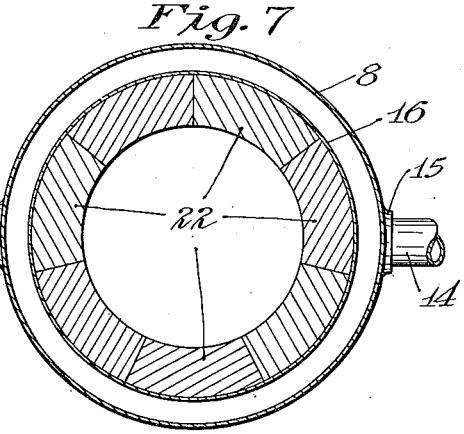
Inventor
Otto F. A. Bieber
By his Attorneys
Williamson & Williamson Patented Mar. 17, 1936

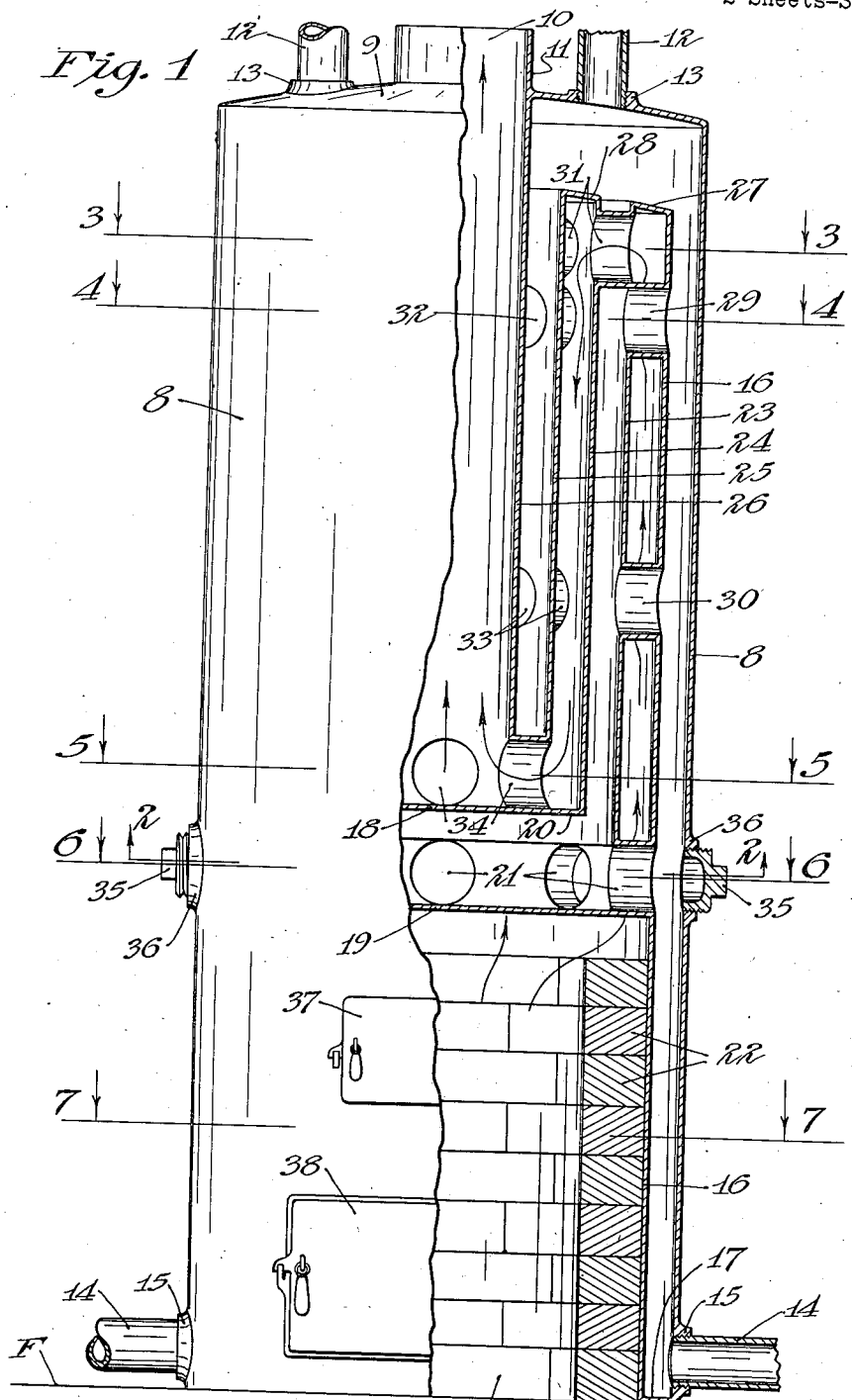

2,034,172

UNITED STATES PATENT OFFICE 2,034,172

HEATING PLANT

Otto F. A. Bieber, Minneapolis, Minn.

Application March 12, 1934, Serial No. 715,174

2 Claims (Cl. 122—160)

My invention pertains to heating plants and more particularly to heating plants for residences and small buildings wherein heat is transferred from a flame to a heat conveying medium, such as water or air.

An object of my invention is to provide a compact, simple, inexpensive, and rugged heating plant of the class described wherein very efficient transfer of heat from a heat producing means to a heat conveying medium can be effected, and which can be used in connection with conventional types of heating systems.

Another object is to provide a heating plant of the class described wherein products of combustion issuing from a heat producing means are forced to pass along a considerable length of heat transferring surface before entering the stack and wherein considerable area of heat transferring surface is exposed to the flames and hot gases.

Still another object is to provide such a heating plant wherein the passages for the flames and hot gases progressively diminish in cross-sectional area in accordance with the contraction of the gases as they are cooled during passage from the heat source to the stack.

A further object is to provide such a heating plant which is particularly well adapted for efficient use with oil burners, gas burners, and automatic stokers, wherein forced draft is used.

These and other objects and advantages of the invention will be more fully set forth in the following description made in connection with the accompanying drawings, in which like reference characters refer to similar parts throughout the several views, and in which:—

Fig. 1 is a vertical view of my heating plant taken partially in elevation and partially in section;

Fig. 2 is a horizontal sectional view of my heating plant taken along the line 2—2 of Fig. 1, as indicated by the arrows;

Fig. 3 is a horizontal sectional view taken along the line 3—3 of Fig. 1 as indicated by the arrows;

Fig. 4 is a horizontal sectional view taken along the line 4—4 of Fig. 1 as indicated by the arrows;

Fig. 5 is a horizontal sectional view taken along the line 5—5 of Fig. 1 as indicated by the arrows;

Fig. 6 is a horizontal sectional view taken along the line 6—6 of Fig. 1, as indicated by the arrows, and Fig. 7 is a horizontal sectional view taken along the line 7—7 of Fig. 1 as indicated by the arrows.

Referring to the drawings, the exterior of my heating plant consists of a vertically disposed cylindrical casing 8, supported and closed at its lower end by a non-combustible floor F and closed at its upper end by means of a circular plate 9 which is arched slightly upwardly. A circular aperture 10, defined by an upwardly extending flange 11 secured to the center portion of the plate 9, forms a flue outlet for products of combustion. The flange 11 affords a means of attachment for a pipe (not shown) leading to a stack or chimney (not shown).

Diametrically located pipes 12, for outgoing heated water or air, are screwed into internally screw threaded bossed portions 13 of the circular plate 9. Diametrically located, horizontally disposed pipes 14, for incoming cooled water or incoming air, are screwed into internally screw threaded, apertured bossed portions 15.

An annular partition 16, concentric with and spaced inwardly of the outer cylindrical casing 8, extends from the floor F to a level somewhat below the level of the plate 9. The respective lower ends of the partition 16 and the casing 8 are connected by an annular closure member 17.

A horizontally disposed circular plate 18, substantially the same in diameter as the opening 10 in the circular plate 9, is concentrically disposed within the medial portion of the partition 16, and a second plate 19, similar to but larger than the plate 18, is disposed below and parallel to the same in spaced relation thereto. An annular plate 20, disposed in the same plane and concentric with the plate 18, is located between the plate 18 and the partition 16 in spaced relation with both thereof.

The circular plate 19 and the floor F respectively form the top and bottom of a firebox. An annular, vertical firebrick lining 22, extending from the floor F to a level somewhat below that of the circular plate 19 and disposed immediately inward of the cylindrical partition 16, forms the sides of the firebox, as shown in Figs. 1 and 7.

A second annular partition 23, disposed within the partition 16 in concentric and spaced relation thereto, forms at its lower end a continuous sealed joint with the circular lower plate 19 and extends upwardly therefrom to substantially the same level as the upper end of the partition 16. A third annular partition 24, extending upwardly from the outer periphery of the annular plate 20 to substantially the same level as the upper end of the partition 23, is disposed within the partition 23 in concentric and spaced relation thereto. A fourth annular partition 25, rising from the inner periphery of the annular plate 20, is similarly disposed within the partition 24. Within the partition 25 is a fifth and innermost annular partition 26, disposed and formed similarly to the previously described partitions, except that it extends from the periphery of the circular plate 18 upwardly to the circular plate 9, where it joins the flue outlet flange 11.

The lower end of each of the annular partitions 24 and 25 is connected to the annular plate 20 and the lower end of the annular partition 26 is connected to the plate 18 to respectively form continuous sealed joints. The respective upper edges of the partitions 16 and 23 are connected by an annular closure member 27 and the respective upper edges of the partitions 24 and 25 are connected by an annular closure member 28, as shown in Fig. 1.

The space between the outer casing 8 and the annular partition 16 is connected to the space between the annular partitions 23 and 24 at the upper portions thereof by a series of radially disposed tubular members 29, as shown in Figs. 1 and 4, and at the lower portions thereof by a series of radially disposed tubular members 30, arranged similarly to the members 29 shown in Fig. 4.

The space between the partitions 16 and 23 is connected to the space between the partitions 24 and 25 at the upper ends thereof by a series of radially disposed tubular members 31, as shown in Figs. 1 and 3.

The space between the partitions 23 and 24 is connected to the space between the partitions 25 and 26 near the upper ends thereof by a series of radially disposed tubular members 32, as shown in Figs. 1 and 4, and near the lower ends thereof by a series of radially disposed tubular members 33, arranged similarly to the members 32, shown in Fig. 4.

The space between the partitions 24 and 25 is connected to the space enclosed within the innermost annular partition 26 at the lower end thereof by a series of radially disposed tubular members 34, as shown in Figs. 1 and 5.

Each one of a diametrically disposed pair of pipe plugs 35, located at the level of the drum formed by the circular plates 18 and 19 and the ring 20, is screwed into an internally screw threaded, apertured, bossed portion 36 of the outer casing 8.

Furnace doors 37 and 38, of conventional design, are hingedly mounted in cooperative relation with suitably framed apertures (not shown) through the outer casing 8, the annular partition 16, and the firebrick lining 22, as shown in Fig. 1, to provide access to the interior of the firebox from the exterior of the heating plant.

With the exception of the firebrick lining 22 and the doors 37 and 38, my heating plant may be constructed of boiler plate parts welded together, or may be constructed of cast parts bolted or otherwise connected together.

Operation

In commercial use of my heating plant, as in connection with a conventional circulating hot water heating system, the flue outlet flange 11 is connected by means of a suitable pipe to a chimney, the pipes 12 and 14 are respectively connected through a system of piping to the inlets and outlets of a plurality of radiators, and a source of flame and hot gases, such as an oil burner, gas burner, or automatic stoker, is positioned to emit flame and hot gases within the interior of the firebox. The exterior of the heating plant may be covered with insulating material if desired.

The heating system, including the piping system and radiators referred to above, and the water passages of my heating plant are filled with water. The water passages of my heating plant comprise the respective spaces between the outer casing 8 and the annular partition 16, between the partitions 23 and 24, between the partitions 25 and 26, between the horizontal circular plates 18 and 20 and the horizontal plate 19 therebelow and between the circular plate 9 and the upper ends of the partitions 16, 23, 24, and 25. All of the spaces enumerated above are interconnected by the tubular members 21, 29, 30, 32 and 33 to permit unhampered movement of water therebetween.

The passages for movement of flame and hot gases from the firebox to the outlet comprise the space between the annular partitions 16 and 23, the tubular members 31, the space between the partitions 24 and 25, the tubular members 34, and the space within the innermost annular partition 26. The products of combustion pass tortuously through the above enumerated passages in the order in which they are mentioned and in the directions indicated by the arrows in Fig. 1.

It is obvious that the entire series of passages for products of combustion is completely surrounded by the water filled spaces and hence that all heat given up by the flame and gases in passing therethrough is delivered to the water to raise the temperature thereof. Due to the great length of the path which the products of combustion are forced to traverse in intimate contact with partitions of relatively low temperature, which, in turn, are in direct contact with a body of water having a still lower temperature, a large per cent. of the heat originally present in the products of combustion is transmitted through the partitions to the water.

As the products of combustion progress through the series of passages, heat is continually being extracted therefrom and the temperature is accordingly being reduced. The reduction in the temperature of the products of combustion is accompanied by contraction or a reduction in volume. In my heating plant, as will be apparent from the drawings, each successive passage of the series traversed by the hot gases, is smaller in cross-sectional area than the preceding passage, with the result that the above described reduction in volume is approximately compensated, and that the velocity of gas flow is substantially uniform, throughout the series of passages.

Water filled spaces are disposed above and around the firebox in order that all heat passing upward and outward from the firebox will be utilized for raising the temperature of the water in the heating plant.

Although my heating plant has been described as used in connection with a conventional hot water heating system of the thermo-syphon circulating type, it is obvious and to be understood that my invention, in its various embodiments, is equally applicable for use with other types of heating systems, such as steam, vapor, or hot air systems.

It is apparent that I have invented a simple, compact, inexpensive, and very efficient heating plant having a series of passages for products of combustion diminishing in size toward the flue outlet to compensate for contraction of the gases as they are cooled and to thereby maintain a substantially uniform velocity in the travel of the products of combustion throughout the entire series of passages. It is also apparent that my heating plant is particularly well adapted for very efficient operation in connection with various forms of forced draft heat producing means, such as oil burners, gas burners, and automatic stokers.

It will, of course, be understood that various changes may be made in the form, details, proportions and arrangement of the parts, without departing from the scope of my invention, which, generally stated, consists in a device capable of carrying out the objects above set forth, and in the novel parts and combinations of parts disclosed and defined in the appended claims.

What is claimed is:—

1. A heating plant comprising an outer casing, a firebox in the lower portion of said casing, a flue outlet, a shallow cylindrical drum disposed concentrically of said casing immediately above said firebox and extending substantially across said firebox to provide a horizontal upper wall therefor, the periphery of said drum being spaced inwardly from said outer casing, means connecting said drum to said casing for support therefrom, and radially spaced annular partitions of heat conductive material within said casing above and joined along their lower edges to the upper wall of said drum and forming a series of passages for a heat conveying medium and a series of passages for products of combustion, said partitions forming walls common to said two series, said second series being connected to said firebox through the annular space between said drum and said casing and to said flue outlet, the portions of the upper wall of said drum underlying said passages for heat conveying medium being cut away to provide communication between said passages for heat conveying medium and the interior of said drum.

2. A heating plant comprising an outer casing, a firebox within the lower portion of said casing, a flue outlet, a series of radially spaced annular vertical partitions disposed within said casing above said firebox, said partitions defining a series of vertical annular passages for products of combustion and a series of vertical annular passages for a heat conveying medium and constituting walls common to said two series, and a shallow drum above said firebox and immediately below said partitions, said drum being open at its upper side in portions below the respective passages of said second series so as to be in communication therewith and provide communication therebetween and being provided with annular portions of a top wall closing the lower ends of the passages of said first series and joined to the lower edges of said partitions, said first series having communication with said firebox and said flue outlet.

OTTO F. A. BIEBER.